US005546264A

United States Patent [19]

Williamson et al.

[11] Patent Number: 5,546,264

[45] Date of Patent: Aug. 13, 1996

[54] REVERSE VOLTAGE PROTECTION CIRCUIT

[75] Inventors: Gregory L. Williamson, Metamora; John P. Hoffman, Peoria, both of Ill.

[73] Assignee: Caterpillar Inc., Peoria, Ill.

[21] Appl. No.: 362,335

[22] Filed: Dec. 22, 1994

[51] Int. Cl.[6] .................................................... H02H 3/18

[52] U.S. Cl. .................................................... 361/84; 361/82

[58] Field of Search .......................................... 361/82, 84

[56] References Cited

U.S. PATENT DOCUMENTS

| | | | |
|---|---|---|---|
| 4,857,985 | 8/1989 | Miller | 361/82 |
| 5,109,162 | 4/1992 | Koch et al. | 361/84 |

*Primary Examiner*—Jeffrey A. Gaffin

*Assistant Examiner*—Stephen Jackson

*Attorney, Agent, or Firm*—Mario J. Donato, Jr.; James R. Yee

[57] ABSTRACT

An apparatus for providing reverse protection to an electronic circuit is provided. The electronic circuit has a positive input terminal and a negative input terminal. The positive input terminal is coupled to a positive battery terminal via the apparatus. The negative input terminal is connected to a negative battery terminal. The apparatus includes a MOSFET transistor having a gate terminal, a drain terminal and a source terminal. One of the drain terminal and the source terminal is connected to the positive battery terminal and an other of the drain terminal and the source terminal is connected to the positive input terminal. One end of a resistor is connected to the gate terminal. One end of a pair of Zener diodes is connected to the gate terminal. The other end is connected to the source terminal.

5 Claims, 1 Drawing Sheet

102

106 d s

108

104

B+

Electronics

114 g

B-

112

110

B+
B-
Electronics 102
106
d
s
108
104
B+
Electronics
114
g
B-
112
110

202
206
s
d
B++
208
204
B+
Electronics
214
212
g
B-
210

REVERSE VOLTAGE PROTECTION CIRCUIT

TECHNICAL FIELD

This invention relates generally to electronic circuits and more particularly to a reverse voltage protection electronic circuit.

BACKGROUND ART

Vehicle electronics are powered using a battery. For example, it is not uncommon for an engine on a construction machine to be controlled by an electronic control module or ECM. The ECM typically includes a microprocessor, sensor circuitry and actuator circuitry. All of the electronics are powered by the machine's battery or batteries.

A construction machine is a harsh environment. Typically, power is applied to the electronics through connectors. If a connector is incorrectly connected, battery voltage is incorrectly applied to the electronics, i.e., reverse polarity. This can cause damage to the electronics and result in increased downtime to effect repairs. The typical solution is to include a diode in the current path from the battery to the electronics. The diode allows current to flow only in one direction and only if power is correctly applied. However, there is an inherent voltage drop across the diode when it is conducting current. Since the diode is always conducting current during normal operation, this results in an unnecessary power loss.

The present invention is directed to overcoming one or more of the problems set forth above.

DISCLOSURE OF THE INVENTION

In one aspect of the present invention, an apparatus for providing reverse protection to an electronic circuit is provided. The electronic circuit has a positive input terminal and a negative input terminal. The positive input terminal is coupled to a positive battery terminal via the apparatus. The negative input terminal is connected to a negative battery terminal. The apparatus includes a MOSFET transistor having a gate terminal, a drain terminal and a source terminal. One of the drain terminal and the source terminal is connected to the positive battery terminal and an other of the drain terminal and the source terminal is connected to the positive input terminal. One end of a resistor is connected to the gate terminal. One end of a pair of Zener diodes is connected to the gate terminal. The other end is connected to the source terminal.

BEST MODE FOR CARRYING OUT THE INVENTION

Figures 1, 2, 3:
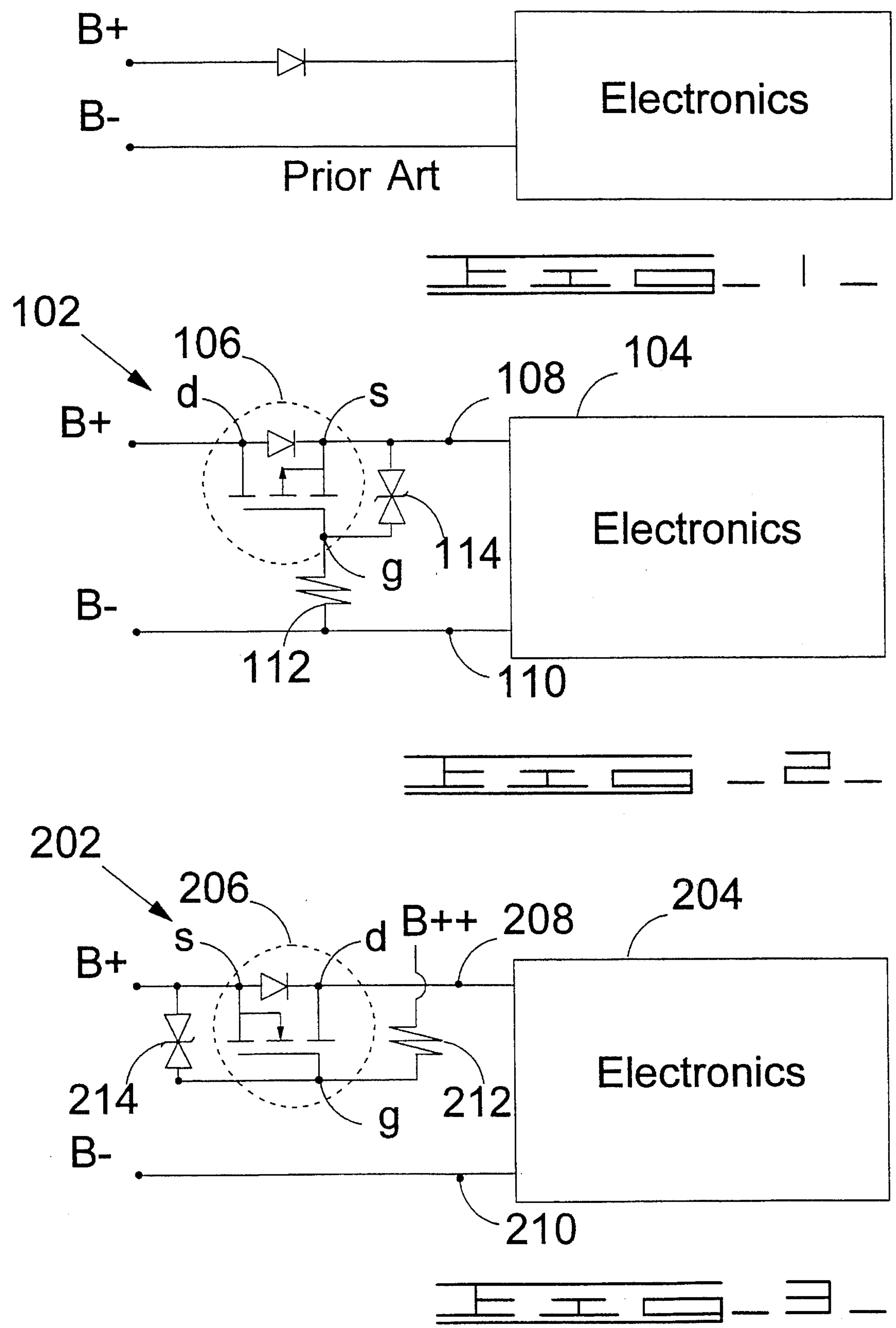
FIG. 1 is a schematic of a prior art reverse voltage protection circuit.
FIG. 2 is a schematic of a voltage protection circuit, according to one embodiment of the present invention; and, FIG. 3 is a schematic of a voltage protection circuit, according to another embodiment of the present invention.

With reference to FIG. 1, in the prior art reverse voltage protection was provided by a diode connected in the path between the battery and the machine electronics. The diode allowed current to flow only in one direction, thus protecting the electronics. Due to the inherent voltage drop across the diode and since the diode is always conducting current during normal operation, this results in an unnecessary power loss.

With reference to FIGS. 2 and 3, the present invention or apparatus 102,202 provides reverse protection to an electronic circuit 104,204. The electronic circuit 104,204 has a positive input terminal 108,208 and a negative input terminal 110,210. The positive input terminal 106,206 is coupled to a positive battery terminal (B+) via the apparatus 102,202. The negative input terminal 110,210 is connected to a negative battery terminal (B–).

The apparatus 102,202 includes a MOSFET transistor 106,206. The transistor has a gate terminal, a drain terminal and a source terminal (g,s,d). The MOSFET transistor 106,206 is not connected in a normal configuration, i.e., the drain-source voltage is reversed from that of a normal configuration. The conduction characteristics of the MOSFET are similar in reverse mode as in forward mode.

With reference to FIG. 2, in one embodiment, the MOSFET transistor is a P channel MOSFET transistor 106. The drain terminal is connected to the positive battery terminal (B+) and the source terminal (s) is connected to the positive input terminal (108).

One end of a resistor 112 is connected to the gate terminal (g). The other end is connected to the negative battery terminal (B–)

One end of a pair of Zener diodes 114 is connected to the gate terminal (g). The other end is connected to the source terminal (s).

With reference to FIG. 3, in another embodiment, the MOSFET transistor is an N channel MOSFET transistor 206. The source terminal is connected to the positive battery terminal (B+). The drain terminal (d) is connected to the positive input terminal 208.

One end of a resistor 212 is connected to the gate terminal (g). The other end is connected to a high voltage terminal (B++). The high voltage is produced by the electronics 204 in a typical manner.

One end of a pair of Zener diodes 214 is connected to the gate terminal (g). The other end is connected to the source terminal (s).

INDUSTRIAL APPLICABILITY

With reference to the drawings and in operation, the present invention or apparatus 102,202, provides reverse voltage protection for an electronic circuit 104,204. The apparatus 102,202 includes a MOSFET transistor 106,206. In one embodiment, the MOSFET transistor 106,206 is a P channel transistor. In another embodiment, the MOSFET transistor 106,206 is an N channel transistor. A pair of Zener diodes 114,214 provide gate protection.

If battery voltage is reversed, the inherent diode between the drain and source acts as an open circuit and prevents current from flowing.

During normal operation the transistor 106,206 is biased ON. In the other embodiment, when ON, the transistor allows current to flow through the drain to the source (or from the source to the drain if an N channel transistor is used). The transistor is chosen based on the battery and the electronics. Although there will be some power losses, the power loss will be less than the series diode of the prior art. That is, the power loss will be less when I * $R_{DSON}$ is less than the power loss from the series diode. I represents the current and $R_{DSON}$ is the resistance across the transistor 106,206 when it is biased ON.

Other aspects, objects, advantages and uses of this invention can be obtained from a study of the drawings, disclosure, and appended claims.

We claim:

1. An apparatus for providing reverse protection to an electronic circuit, the electronic circuit having a positive input terminal and a negative input terminal, the positive input terminal being coupled to a positive battery terminal via the apparatus and the negative input terminal being connected to a negative battery terminal, comprising:

a MOSFET transistor having a gate terminal, a drain terminal and a source terminal, said MOSFET operating in reverse mode, one of said drain terminal and said source terminal being connected to said positive battery terminal and an other of said drain terminal and said source terminal being connected to said positive input terminal;

a resistor having one end connected to said gate terminal; and a pair of Zener diodes having one end connected to said gate terminal and another end connected to said source terminal.

2. An apparatus, as set forth in claim 1, wherein said MOSFET transistor is a P channel MOSFET and wherein another end of said resistor 212 is connected to a negative battery terminal, another end of said pair of Zener diodes is connected to said negative input terminal, said drain terminal of said P channel MOSFET is connected to said positive battery terminal, and said source terminal of said P channel MOSFET is connected to said positive input terminal.

3. An apparatus, as set forth in claim 1, wherein said MOSFET transistor is an N channel MOSFET and wherein another end of said resistor is connected to a high voltage terminal, another end of said pair of Zener diodes is connected to said positive input terminal, said source terminal of said N channel MOSFET is connected to said positive battery terminal, and said drain terminal of said N channel MOSFET being connected to said positive input terminal.

4. An apparatus for providing reverse protection to an electronic circuit, the electronic circuit having a positive input terminal and a negative input terminal, the positive input terminal being coupled to a positive battery terminal via the apparatus and the negative input terminal being connected to a negative battery terminal, comprising:

a P channel MOSFET transistor having a gate terminal, a drain terminal and a source terminal, said MOSFET operating in reverse mode, said drain terminal being connected to said positive battery terminal and said source terminal being connected to said positive input terminal;

a resistor having one end connected to said gate terminal and another end connected to the negative battery terminal; and a pair of Zener diodes having one end connected to said gate terminal and another end connected to said source terminal.

5. An apparatus for providing reverse protection to an electronic circuit, the electronic circuit having a positive input terminal and a negative input terminal, the positive input terminal being coupled to a positive battery terminal via the apparatus and the negative input terminal being connected to a negative battery terminal, comprising:

an N channel MOSFET transistor having a gate terminal, a drain terminal and a source terminal, said MOSFET operating in reverse mode, said source terminal being connected to said positive battery terminal and said drain terminal being connected to said positive input terminal;

a resistor having one end connected to said gate terminal and another end connected to a high voltage terminal; and a pair of Zener diodes having one end connected to said gate terminal and another end connected to said source terminal.

* * * * *